United States Patent
Sutanto et al.

(10) Patent No.: US 9,372,698 B2
(45) Date of Patent: Jun. 21, 2016

(54) METHOD AND APPARATUS FOR IMPLEMENTING DYNAMIC PORTBINDING WITHIN A RESERVATION STATION

(71) Applicant: INTEL CORPORATION, Santa Clara, CA (US)

(72) Inventors: Bambang Sutanto, Portland, OR (US); Srikanth T. Srinivasan, Portland, OR (US); Matthew C. Merten, Hillsboro, OR (US); Chia Yin Kevin Lai, Portland, OR (US); Ammon J Christiansen, Aloha, OR (US); Justin M Deinlein, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 198 days.

(21) Appl. No.: 13/931,864

(22) Filed: Jun. 29, 2013

(65) Prior Publication Data

US 2015/0007188 A1   Jan. 1, 2015

(51) Int. Cl.
*G06F 9/38* (2006.01)
*G06F 9/48* (2006.01)

(52) U.S. Cl.
CPC ............ *G06F 9/3836* (2013.01); *G06F 9/4881* (2013.01)

(58) Field of Classification Search
None
See application file for complete search history.

(56) References Cited

U.S. PATENT DOCUMENTS

| | | | | |
|---|---|---|---|---|
| 5,684,971 A | * | 11/1997 | Martell | G06F 9/3836 712/214 |
| 2008/0244235 A1 | * | 10/2008 | Castro | G06F 9/3017 712/219 |
| 2014/0189328 A1 | * | 7/2014 | Weiner | G06F 9/30043 712/228 |

* cited by examiner

*Primary Examiner* — Qing Wu
(74) *Attorney, Agent, or Firm* — Nicholson De Vos Webster & Elliott LLP

(57) ABSTRACT

A processor and method are described for scheduling operations for execution within a reservation station. For example, a method in accordance with one embodiment of the invention includes the operations of: classifying a plurality of operations based on the execution ports usable to execute those operations; allocating the plurality of operations into groups within a reservation station based on the classification, wherein each group is serviced by one or more execution ports corresponding to the classification, and wherein two or more entries within a group share a common read port and a common write port; dynamically scheduling two or more operations in a group for concurrent execution based on the ports capable of executing those operations and a relative age of the operations.

24 Claims, 14 Drawing Sheets

| PB class | Dynamic PB Groups | Static PB Groups |
|---|---|---|
| 0 | | G0, G1 |
| 1 | | G0, G2 |
| 5 | | G2, G4 |
| 6 | | G1, G3 |
| 8 | | G4, G5 |
| 0, 1 | G0 | G1, G2 |
| 0, 6 | G1 | G0, G3 |
| 1, 5 | G2 | G0, G4 |
| 5, 8 | G4 | G2, G5 |
| 1, 8 | | G0, G2, G4, G5 |
| 8, 1, 5 | G2, G4 | |
| 0, 1, 5, 6 | G0, G1, G2 | |
| 2 | | G6, G8 |
| 3 | | G7, G8 |
| 2, 3 | G8 | G6, G7 |
| 2, 3, 7 | G6, G7, G8 | |

FIG. 11

| Oldest ready uop in G0 | Other winner from this Group | Comments |
|---|---|---|
| B0, P0 | B1P1M9 winner | |
| B0, P1 | B1P0M9 winner | |
| B0, P01 | | If B1 has only a P0 ready uop (based on OR9 result), convert B0, P01 into a B0, P1. If B1 has only a P1 ready uop (based on OR9 result), convert B0, P01 into a B0, P0. If B1 has both a P0 ready uop and P1 ready uop or if B1 has no ready uop, convert this B0, P01 into a B0, P0 or B0, P1 in a ping-pong fashion based on Table below. If the picker is going to give priority to P0 to this group based on the Ping-pong Table, it might be better to convert B0, P01 into B0, P0 as well. |
| B1, P0 | B0P1M9 winner | |
| B1, P1 | B0P0M9 winner | |
| B1, P01 | | If B0 has only a P0 ready uop (based on OR9 result), convert B1, P01 into a B1, P1. If B0 has only a P1 ready uop (based on OR9 result), convert B1, P01 into a B1, P0. If B0 has both a P0 ready uop and P1 ready uop or if B0 has no ready uop, convert this B1, P01 into a B1, P0 or B1, P1 in a ping-pong fashion based on Table below. If the picker is going to give priority to P0 to this group based on the Ping-pong Table, it might be better to convert B1, P01 into B1, P0 as well. |

FIG. 12

| Ping-pong Table | |
|---|---|
| Odd | Even |
| G0 – 0 | G1 – 0 |
| G2 – 1 | G0 – 1 |
| G3 – 4 | G5 – 4 |
| G4 – 5 | G2 – 5 |
| G1 – 6 | G3 – 6 |
| G5 – 8 | G4 – 8 |
| G6 – 2 | G8 – 2 |
| G8 – 3 | G7 – 3 |
| G7 – 7 | G2 – 7 |

FIG. 13

METHOD AND APPARATUS FOR IMPLEMENTING DYNAMIC PORTBINDING WITHIN A RESERVATION STATION

BACKGROUND

1. Field of the Invention

This invention relates generally to the field of computer processors and software. More particularly, the invention relates to a method and apparatus for implementing dynamic portbinding within a reservation station.

2. Description of the Related Art

In a processor capable of out-of-order execution, instruction dispatching is stalled when there is a conflict for a particular functional unit or when a dispatched instruction depends on the result of an instruction that is not yet computed. In order to prevent or mitigate stalls in decoding, a reservation station (RS) may be used between the decode and execute stages of the processor. The decode stage decodes instructions and places the resulting micro-operations (uops) into the reservation station. Uops are examined in the reservation station to identify those which can be dispatched to the functional units of the execution unit (i.e., those for which source operands and functional units are available). Data-ready uops are dispatched from the reservation station out of program order.

Uops may be dispatched from the reservation station via multiple dispatch ports. Existing processor architectures implement reservation stations 10s of buffer entries for uops and which typically support many read ports to read out uops at dispatch time each cycle. Given the high latency associated with memory operations, a larger reservation station buffer would be beneficial for performance (e.g., to dispatch uops while waiting on high latency loads). However, a larger reservation station with many read ports would severely impact timing.

BRIEF DESCRIPTION OF THE DRAWINGS

A better understanding of the present invention can be obtained from the following detailed description in conjunction with the following drawings, in which:

FIG. 11 is a table showing dynamic and static portbinding groups for different portbinding classes of uops;

FIG. 12 illustrates one embodiment of a method for scheduling uops.

FIG. 13 illustrates one embodiment of ping-ponging priority between Groups to for scheduling to a particular dispatch port

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures and Data Types

Figure 1:
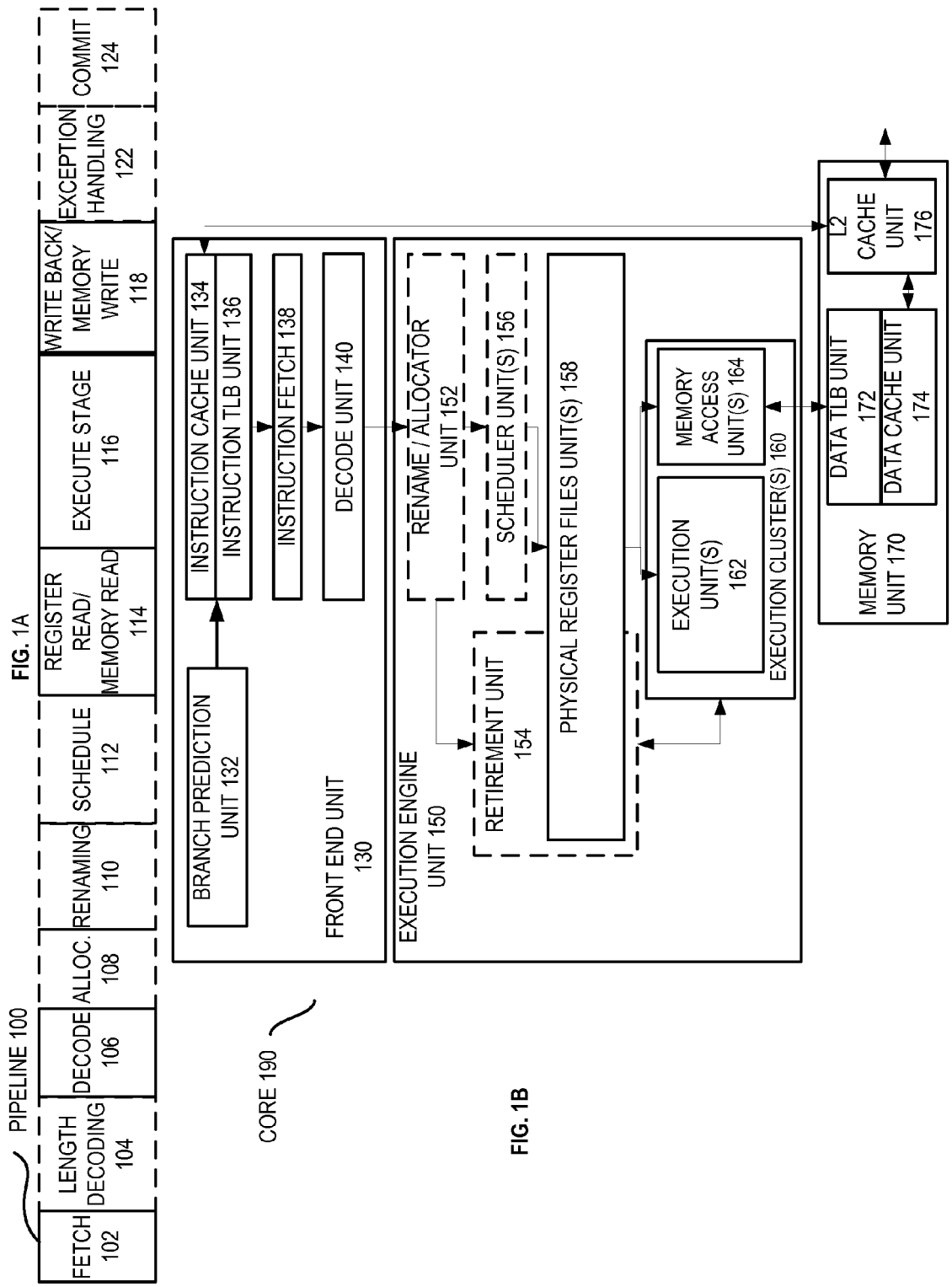
FIG. 1A is a block diagram illustrating both an exemplary in-order fetch, decode, retire pipeline and an exemplary register renaming, out-of-order issue/execution pipeline according to embodiments of the invention.
FIG. 1B is a block diagram illustrating both an exemplary embodiment of an in-order fetch, decode, retire core and an exemplary register renaming, out-of-order issue/execution architecture core to be included in a processor according to embodiments of the invention.

FIG. 1A is a block diagram illustrating both an exemplary in-order fetch, decode, retire pipeline and an exemplary register renaming, out-of-order issue/execution pipeline according to embodiments of the invention. FIG. 1B is a block diagram illustrating both an exemplary embodiment of an in-order fetch, decode, retire core and an exemplary register renaming, out-of-order issue/execution architecture core to be included in a processor according to embodiments of the invention. The solid lined boxes in FIGS. 1A-B illustrate the in-order portions of the pipeline and core, while the optional addition of the dashed lined boxes illustrates the register renaming, out-of-order issue/execution pipeline and core.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit, a write mask registers unit, and a scalar registers unit. These register units may provide architectural vector registers, vector mask registers, and general purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 190 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
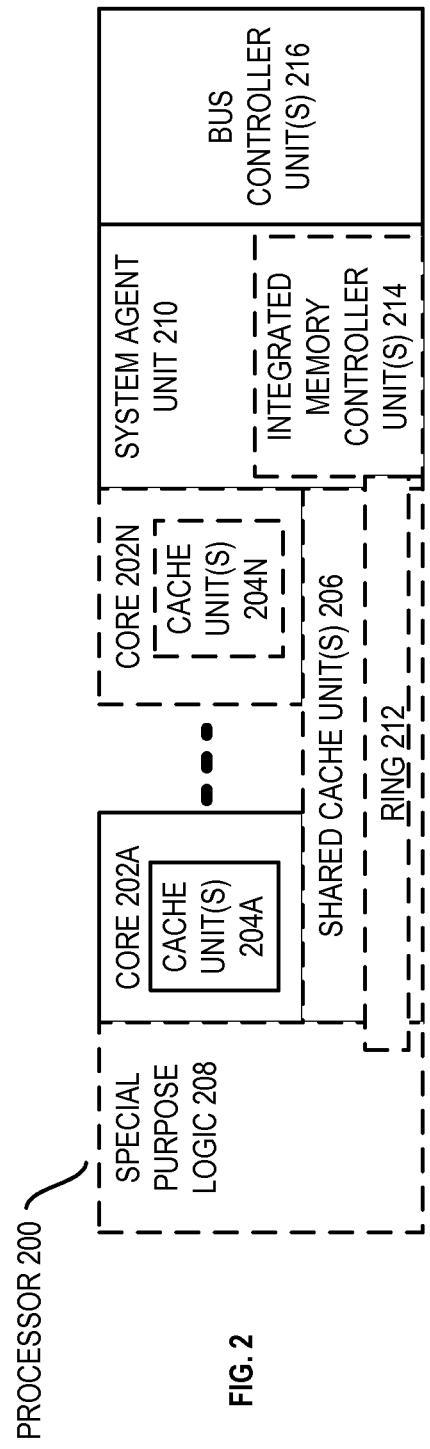
FIG. 2 is a block diagram of a single core processor and a multicore processor with integrated memory controller and graphics according to embodiments of the invention.

FIG. 2 is a block diagram of a processor 200 that may have more than one core, may have an integrated memory controller, and may have integrated graphics according to embodiments of the invention. The solid lined boxes in FIG. 2 illustrate a processor 200 with a single core 202A, a system agent 210, a set of one or more bus controller units 216, while the optional addition of the dashed lined boxes illustrates an alternative processor 200 with multiple cores 202A-N, a set of one or more integrated memory controller unit(s) 214 in the system agent unit 210, and special purpose logic 208.

Thus, different implementations of the processor 200 may include: 1) a CPU with the special purpose logic 208 being integrated graphics and/or scientific (throughput) logic (which may include one or more cores), and the cores 202A-N being one or more general purpose cores (e.g., general purpose in-order cores, general purpose out-of-order cores, a combination of the two); 2) a coprocessor with the cores 202A-N being a large number of special purpose cores intended primarily for graphics and/or scientific (throughput); and 3) a coprocessor with the cores 202A-N being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect unit 212 interconnects the integrated graphics logic 208, the set of shared cache units 206, and the system agent unit 210/integrated memory controller unit(s) 214, alternative embodiments may use any number of well-known techniques for interconnecting such units. In one embodiment, coherency is maintained between one or more cache units 206 and cores 202-A-N.

In some embodiments, one or more of the cores 202A-N are capable of multi-threading. The system agent 210 includes those components coordinating and operating cores 202A-N. The system agent unit 210 may include for example a power control unit (PCU) and a display unit. The PCU may be or include logic and components needed for regulating the power state of the cores 202A-N and the integrated graphics logic 208. The display unit is for driving one or more externally connected displays.

The cores 202A-N may be homogenous or heterogeneous in terms of architecture instruction set; that is, two or more of the cores 202A-N may be capable of execution the same instruction set, while others may be capable of executing only a subset of that instruction set or a different instruction set. In one embodiment, the cores 202A-N are heterogeneous and include both the "small" cores and "big" cores described below.

FIGS. 3-6 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 3:
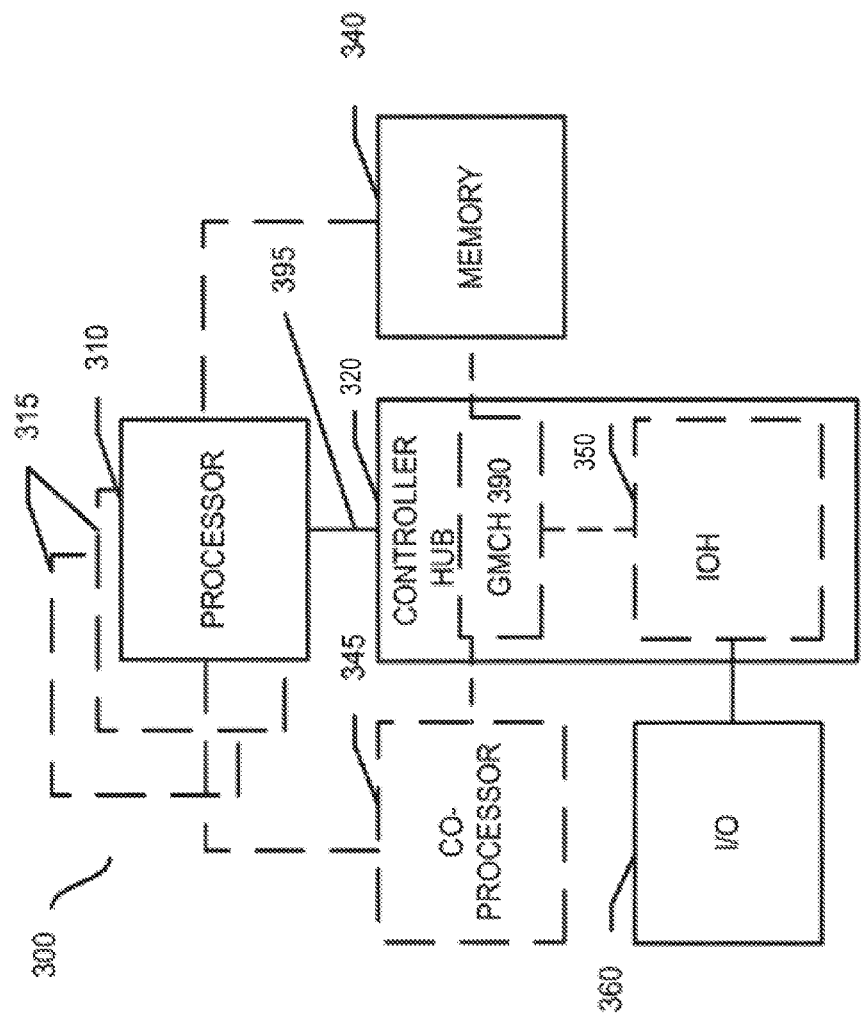
FIG. 3 illustrates a block diagram of a system in accordance with one embodiment of the present invention.

Referring now to FIG. 3, shown is a block diagram of a system 300 in accordance with one embodiment of the present invention. The system 300 may include one or more processors 310, 315, which are coupled to a controller hub 320. In one embodiment the controller hub 320 includes a graphics memory controller hub (GMCH) 390 and an Input/Output Hub (IOH) 350 (which may be on separate chips); the GMCH 390 includes memory and graphics controllers to which are coupled memory 340 and a coprocessor 345; the IOH 350 is couples input/output (I/O) devices 360 to the GMCH 390. Alternatively, one or both of the memory and graphics controllers are integrated within the processor (as described herein), the memory 340 and the coprocessor 345 are coupled directly to the processor 310, and the controller hub 320 in a single chip with the IOH 350.

The optional nature of additional processors 315 is denoted in FIG. 3 with broken lines. Each processor 310, 315 may include one or more of the processing cores described herein and may be some version of the processor 200.

The memory 340 may be, for example, dynamic random access memory (DRAM), phase change memory (PCM), or a combination of the two. For at least one embodiment, the controller hub 320 communicates with the processor(s) 310, 315 via a multi-drop bus, such as a frontside bus (FSB), point-to-point interface such as QuickPath Interconnect (QPI), or similar connection 395.

In one embodiment, the coprocessor 345 is a special-purpose processor, such as, for example, a high-throughput MIC processor, a network or communication processor, compression engine, graphics processor, GPGPU, embedded processor, or the like. In one embodiment, controller hub 320 may include an integrated graphics accelerator.

There can be a variety of differences between the physical resources 310, 315 in terms of a spectrum of metrics of merit including architectural, microarchitectural, thermal, power consumption characteristics, and the like.

In one embodiment, the processor 310 executes instructions that control data processing operations of a general type. Embedded within the instructions may be coprocessor instructions. The processor 310 recognizes these coprocessor instructions as being of a type that should be executed by the attached coprocessor 345. Accordingly, the processor 310 issues these coprocessor instructions (or control signals representing coprocessor instructions) on a coprocessor bus or other interconnect, to coprocessor 345. Coprocessor(s) 345 accept and execute the received coprocessor instructions.

Figure 4:
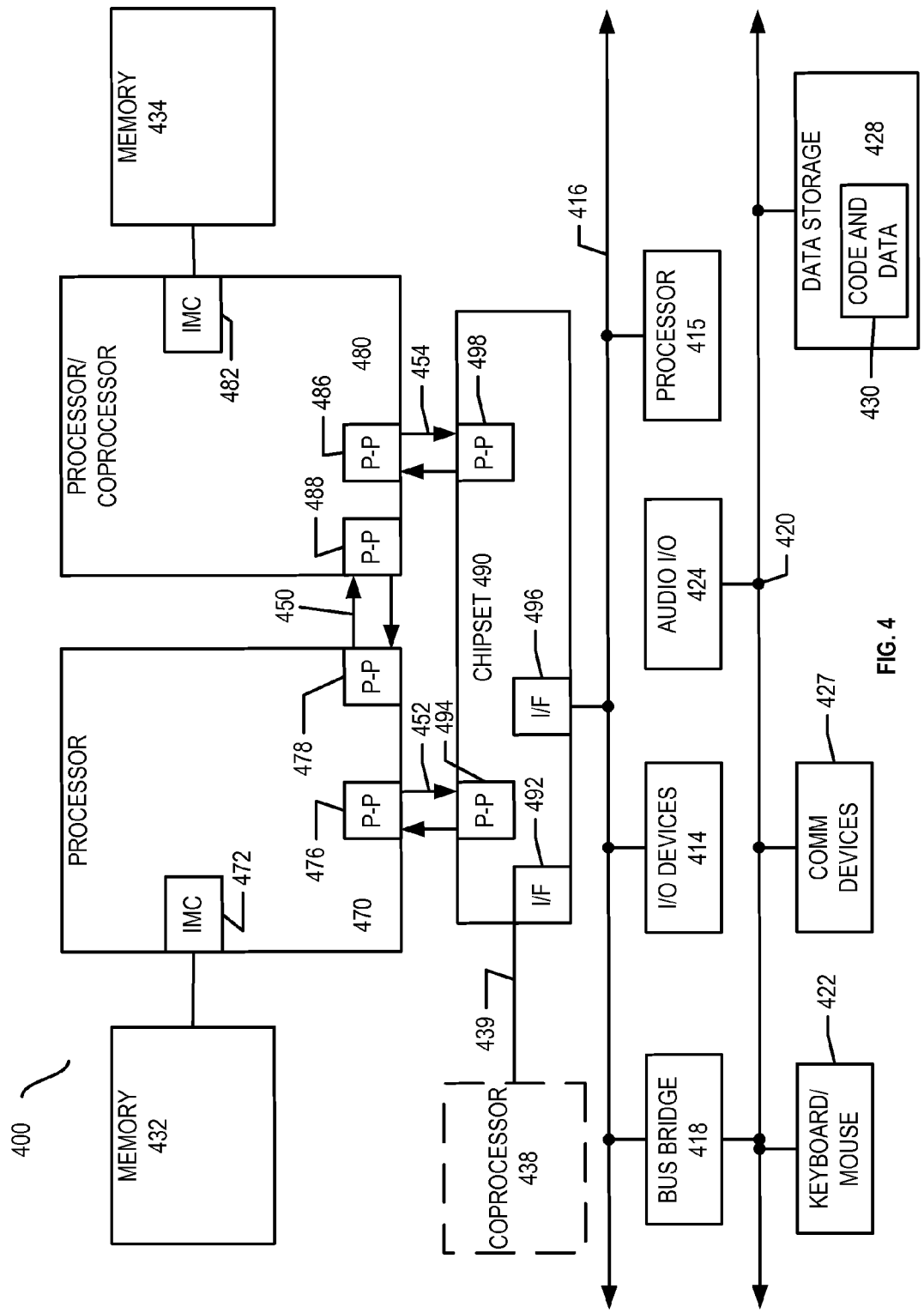
FIG. 4 illustrates a block diagram of a second system in accordance with an embodiment of the present invention.

Referring now to FIG. 4, shown is a block diagram of a first more specific exemplary system 400 in accordance with an embodiment of the present invention. As shown in FIG. 4, multiprocessor system 400 is a point-to-point interconnect system, and includes a first processor 470 and a second processor 480 coupled via a point-to-point interconnect 450. Each of processors 470 and 480 may be some version of the processor 200. In one embodiment of the invention, processors 470 and 480 are respectively processors 310 and 315, while coprocessor 438 is coprocessor 345. In another embodiment, processors 470 and 480 are respectively processor 310 coprocessor 345.

Processors 470 and 480 are shown including integrated memory controller (IMC) units 472 and 482, respectively. Processor 470 also includes as part of its bus controller units point-to-point (P-P) interfaces 476 and 478; similarly, second processor 480 includes P-P interfaces 486 and 488. Processors 470, 480 may exchange information via a point-to-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors.

Processors 470, 480 may each exchange information with a chipset 490 via individual P-P interfaces 452, 454 using point to point interface circuits 476, 494, 486, 498. Chipset 490 may optionally exchange information with the coprocessor 438 via a high-performance interface 439. In one embodiment, the coprocessor 438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of the present invention is not so limited.

As shown in FIG. 4, various I/O devices 414 may be coupled to first bus 416, along with a bus bridge 418 which couples first bus 416 to a second bus 420. In one embodiment, one or more additional processor(s) 415, such as coprocessors, high-throughput MIC processors, GPGPU's, accelerators (such as, e.g., graphics accelerators or digital signal processing (DSP) units), field programmable gate arrays, or any other processor, are coupled to first bus 416. In one embodiment, second bus 420 may be a low pin count (LPC) bus. Various devices may be coupled to a second bus 420 including, for example, a keyboard and/or mouse 422, communication devices 427 and a storage unit 428 such as a disk drive or other mass storage device which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

Figure 5:
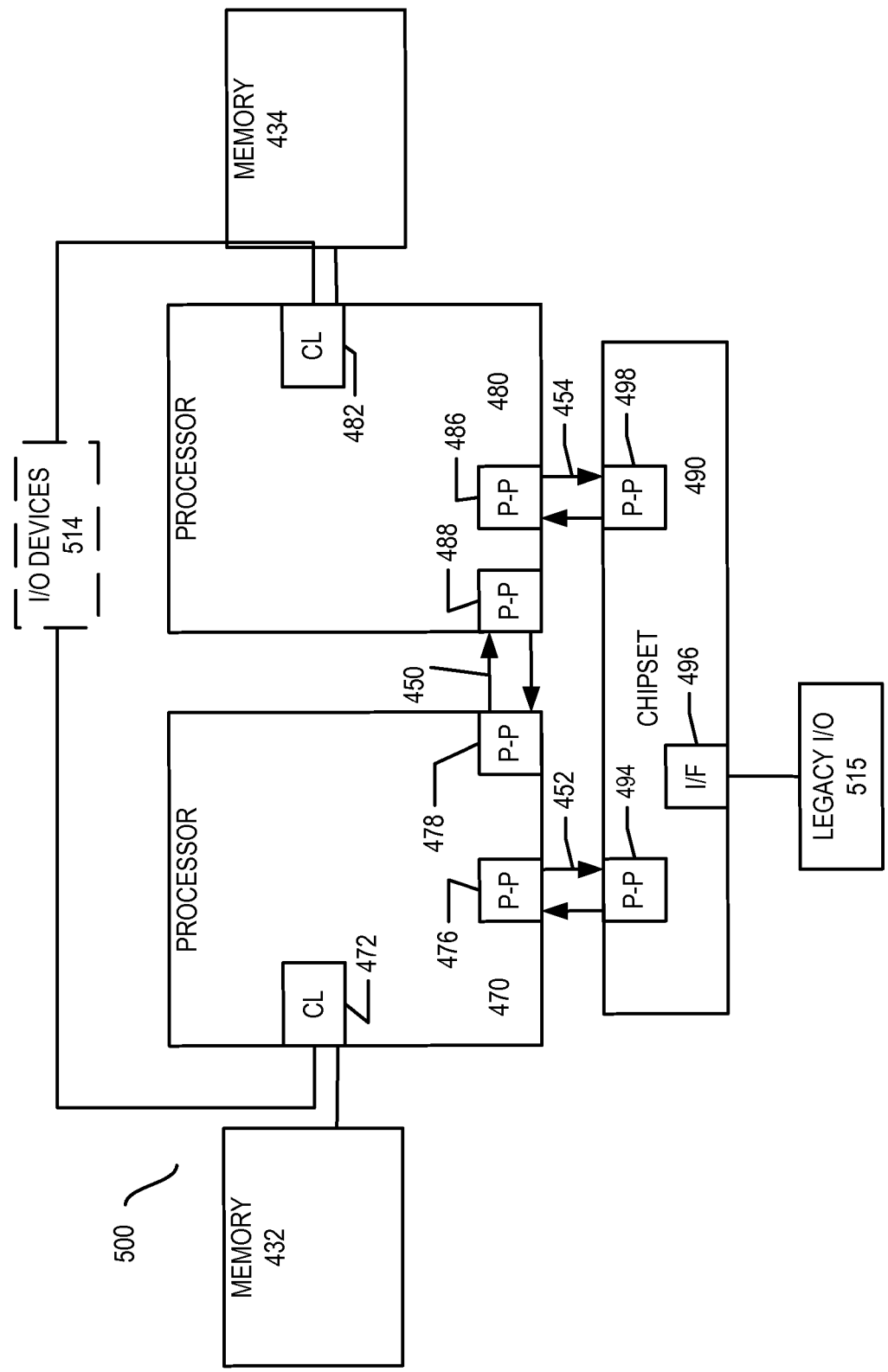
FIG. 5 illustrates a block diagram of a third system in accordance with an embodiment of the present invention.

Referring now to FIG. 5, shown is a block diagram of a second more specific exemplary system 500 in accordance with an embodiment of the present invention. Like elements in FIGS. 4 and 5 bear like reference numerals, and certain aspects of FIG. 4 have been omitted from FIG. 5 in order to avoid obscuring other aspects of FIG. 5.

FIG. 5 illustrates that the processors 470, 480 may include integrated memory and I/O control logic ("CL") 472 and 482, respectively. Thus, the CL 472, 482 include integrated memory controller units and include I/O control logic. FIG. 5 illustrates that not only are the memories 432, 434 coupled to the CL 472, 482, but also that I/O devices 514 are also coupled to the control logic 472, 482. Legacy I/O devices 515 are coupled to the chipset 490.

Figure 6:
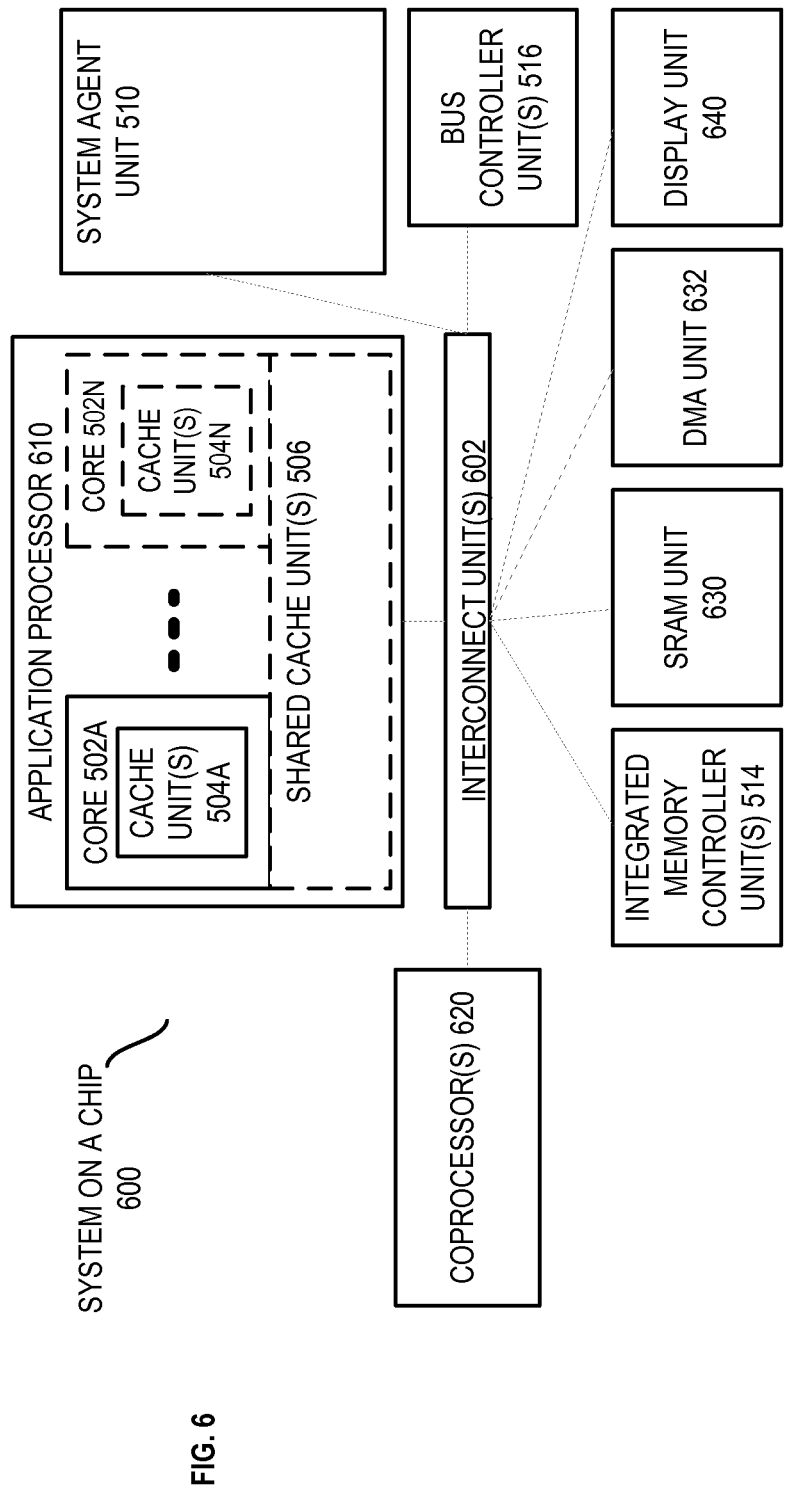
FIG. 6 illustrates a block diagram of a system on a chip (SoC) in accordance with an embodiment of the present invention.

Referring now to FIG. 6, shown is a block diagram of a SoC 600 in accordance with an embodiment of the present invention. Similar elements in FIG. 2 bear like reference numerals. Also, dashed lined boxes are optional features on more advanced SoCs. In FIG. 6, an interconnect unit(s) 602 is coupled to: an application processor 610 which includes a set of one or more cores 202A-N and shared cache unit(s) 206; a system agent unit 210; a bus controller unit(s) 216; an integrated memory controller unit(s) 214; a set or one or more coprocessors 620 which may include integrated graphics logic, an image processor, an audio processor, and a video processor; an static random access memory (SRAM) unit 630; a direct memory access (DMA) unit 632; and a display unit 640 for coupling to one or more external displays. In one embodiment, the coprocessor(s) 620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 430 illustrated in FIG. 4, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 7:
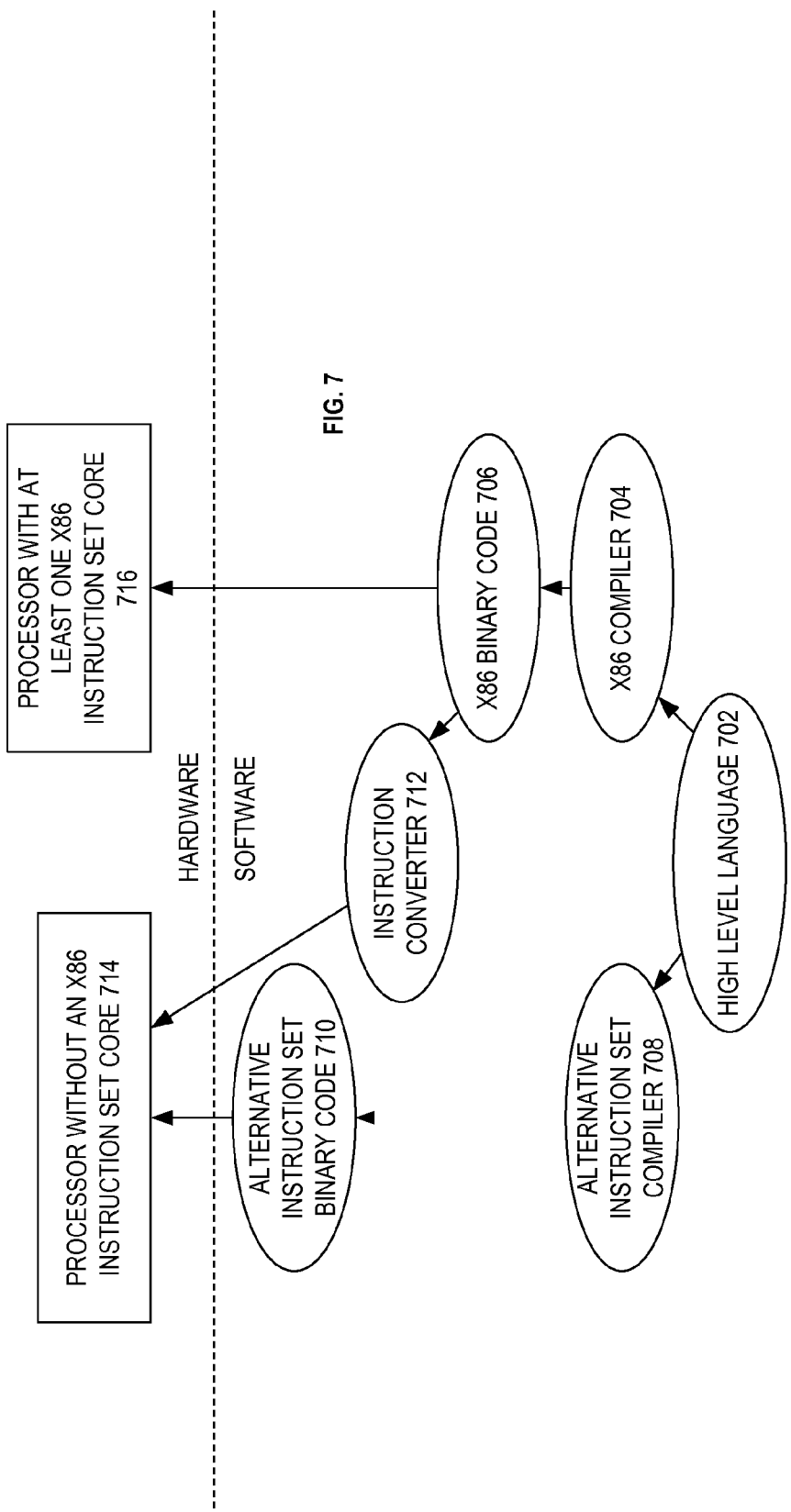
FIG. 7 illustrates a block diagram contrasting the use of a software instruction converter to convert binary instructions in a source instruction set to binary instructions in a target instruction set according to embodiments of the invention.

FIG. 7 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 7 shows a program in a high level language 702 may be compiled using an x86 compiler 704 to generate x86 binary code 706 that may be natively executed by a processor with at least one x86 instruction set core 716. The processor with at least one x86 instruction set core 716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 704 represents a compiler that is operable to generate x86 binary code 706 (e.g., object code) that can, with or without additional linkage processing, be executed on the processor with at least one x86 instruction set core 716. Similarly, FIG. 7 shows the program in the high level language 702 may be compiled using an alternative instruction set compiler 708 to generate alternative instruction set binary code 710 that may be natively executed by a processor without at least one x86 instruction set core 714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 712 is used to convert the x86 binary code 706 into code that may be natively executed by the processor without an x86 instruction set core 714. This converted code is not likely to be the same as the alternative instruction set binary code 710 because an instruction converter capable of this is difficult to make; however, the converted code will accomplish the general operation and be made up of instructions from the alternative instruction set. Thus, the instruction converter 712 represents software, firmware, hardware, or a combination thereof that, through emulation, simulation or any other process, allows a processor or other electronic device that does not have an x86 instruction set processor or core to execute the x86 binary code 706.

Method and Apparatus for Dynamic Portbinding within a Reservation Station

One embodiment of the invention implements dynamic portbinding within a reservation station to improve performance. In addition, one embodiment employs a single read port, single write port reservation station that supports significantly more entries than current reservation stations (e.g., 150 or greater). It should be noted, however, that the underlying principles of the invention may be implemented on a reservation station having more than one read port and more than one write port. For example, in one embodiment, the dynamic portbinding techniques described herein are implemented in a processor which includes two or more read/write ports.

Figure 8:
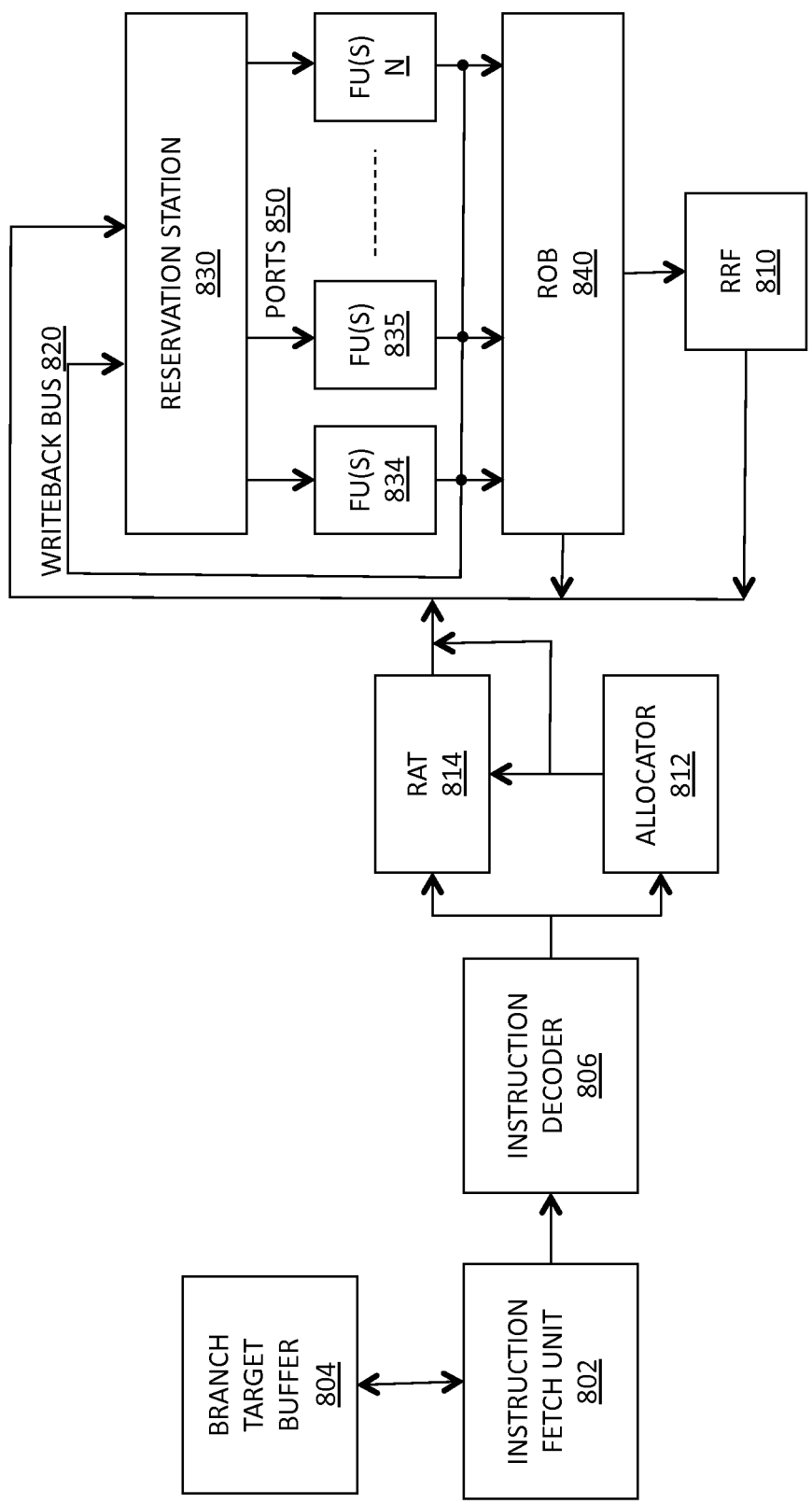
FIG. 8 illustrates one embodiment of a processor architecture.

FIG. 8 illustrates some of the processor architectural components which are particularly relevant to the embodiments described herein. In particular, FIG. 8 illustrates a speculative out-of-order microprocessor which may incorporate the embodiments of the invention. The processor comprises an instruction fetch unit (IFU) 802 coupled to a branch target buffer (BTB) 804 and an instruction decoder (ID) 806. Based upon the instruction pointer (IP) provided by the branch target buffer (BTB) 804 to the instruction fetch unit (IFU) 802, the instruction fetch unit (IFU) 802 fetches a macro instruction found at the address in memory (not shown) that is indicated by the IP. The instruction is decoded into one or more micro-operations (uops) by the instruction decoder 806. The instruction decoder 806 transfers the stream of uops to a register alias table (RAT) 814 and an allocator unit 812.

The allocator unit 812 assigns each incoming uop to a location in the reorder buffer (ROB) 840, thereby mapping the logical destination address of the uop to a corresponding physical destination address in the ROB 840. The register alias table (RAT) 814 maintains this mapping.

The contents of a ROB 840 are retired to locations in a real register file (RRF) 810. The RAT 814 thus also stores a real register file valid bit that indicates whether the value indicated by the logical address is to be found at the physical address in the recorder buffer (ROB) or in the RRF after retirement. If found in the RRF, the value is considered to be part of the current processor architectural state. Based upon this mapping, the register alias table (RAT) 814 also associates every logical source address to a corresponding location in the ROB 840 or the RRF 810 (the source operand of one instruction generally must have been the destination of a previous instruction).

Each incoming uop is also assigned and written into an entry in the reservation station (RS) 830 by the allocator 812. The reservation station 830 assembles the uops awaiting execution by an appropriate functional unit 834, 835, N, which may include, for example, integer execution units, floating point execution units, memory execution units, address generation units, etc. Results are written back to the RS 830 over a writeback bus 820.

Figure 9:
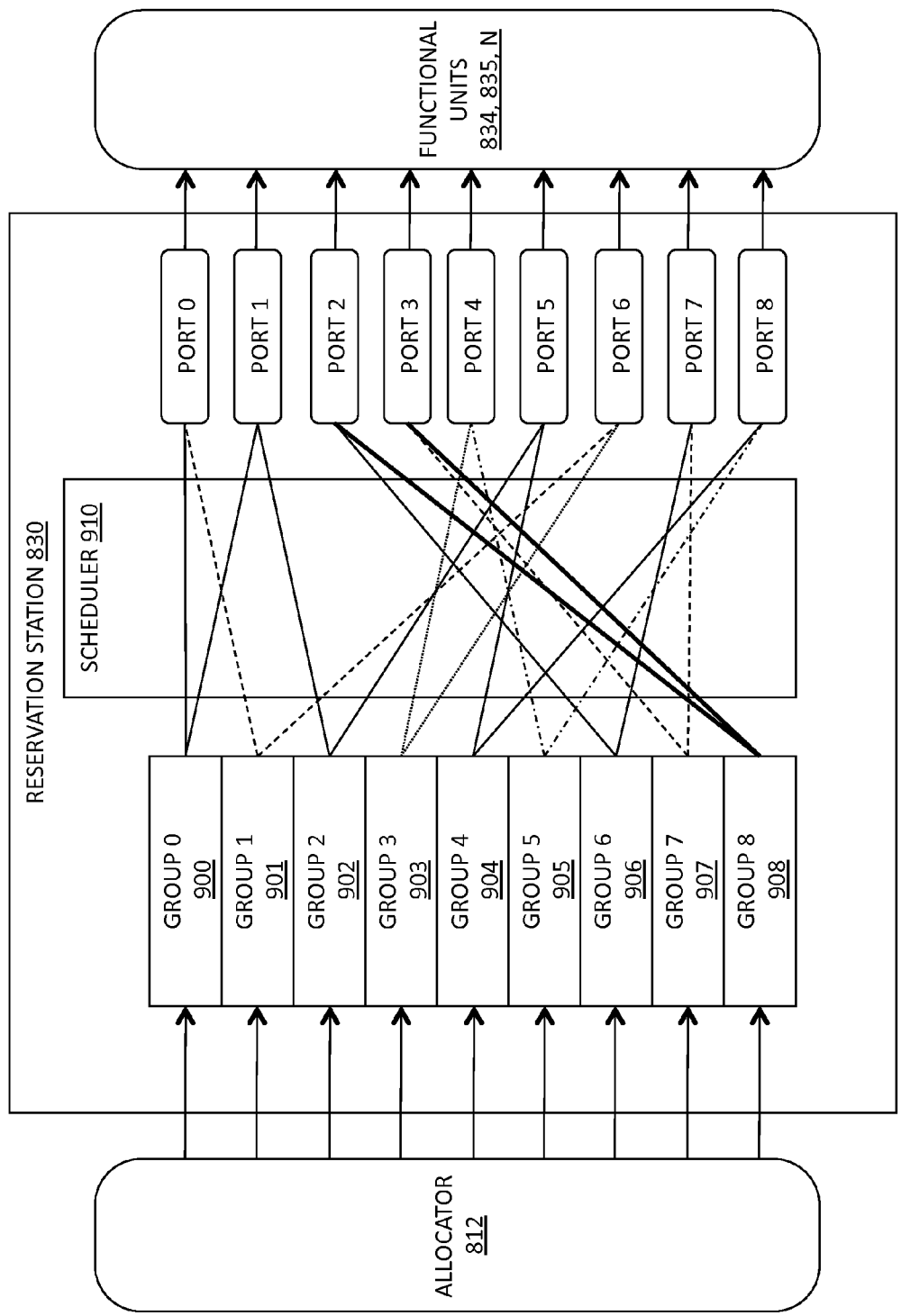
FIG. 9 illustrates an exemplary reservation station with entries arranged into groups.

In one embodiment, reservation station entries are logically subdivided into groups to reduce the number of read and write ports required for reading and writing the entries, respectively. FIG. 9 illustrates one such embodiment comprising 9 different reservation station groups 900-908 each of which is associated with two different functional unit ports. In the specific example shown:

group 0 900 is associated with ports 0 and 1;
group 1 901 is associated with ports 0 and 6;
group 2 902 is associated with ports 1 and 5;
group 3 903 is associated with ports 4 and 6;
group 4 904 is associated with ports 5 and 8;
group 5 905 is associated with ports 4 and 8;
group 6 906 is associated with ports 2 and 7;
group 7 907 is associated with ports 3 and 7; and
group 8 908 is associated with ports 2 and 3.

In operation, the allocator 812 allocates uops to groups based on the types of functional units capable of executing those uops. For example, if a particular uop can only be executed by the functional unit(s) coupled to port 1, then the allocator 812 allocates this uop to either group 0 or group 2 because these are the only two groups coupled to port 1. Similarly, if a particular uop can be executed by either port 0 or port 1, then the allocator 812 may allocate this uop to groups 0, 1, or 2 (because these groups are all coupled to port 0 and port 1).

In one embodiment, the scheduler 910 may dynamically schedule uops for execution over ports. For example, if a particular uop which can be executed over either ports 0 or 1 is allocated to group 0, then the scheduler 910 may determine at execution time (or just prior to execution) which port to use for the execution of the uop. As discussed in detail below, the scheduler 910 may determine the port to which a uop should be sent based on variables such as the current load on each port and the relative age of each uop in each group.

Figure 10:
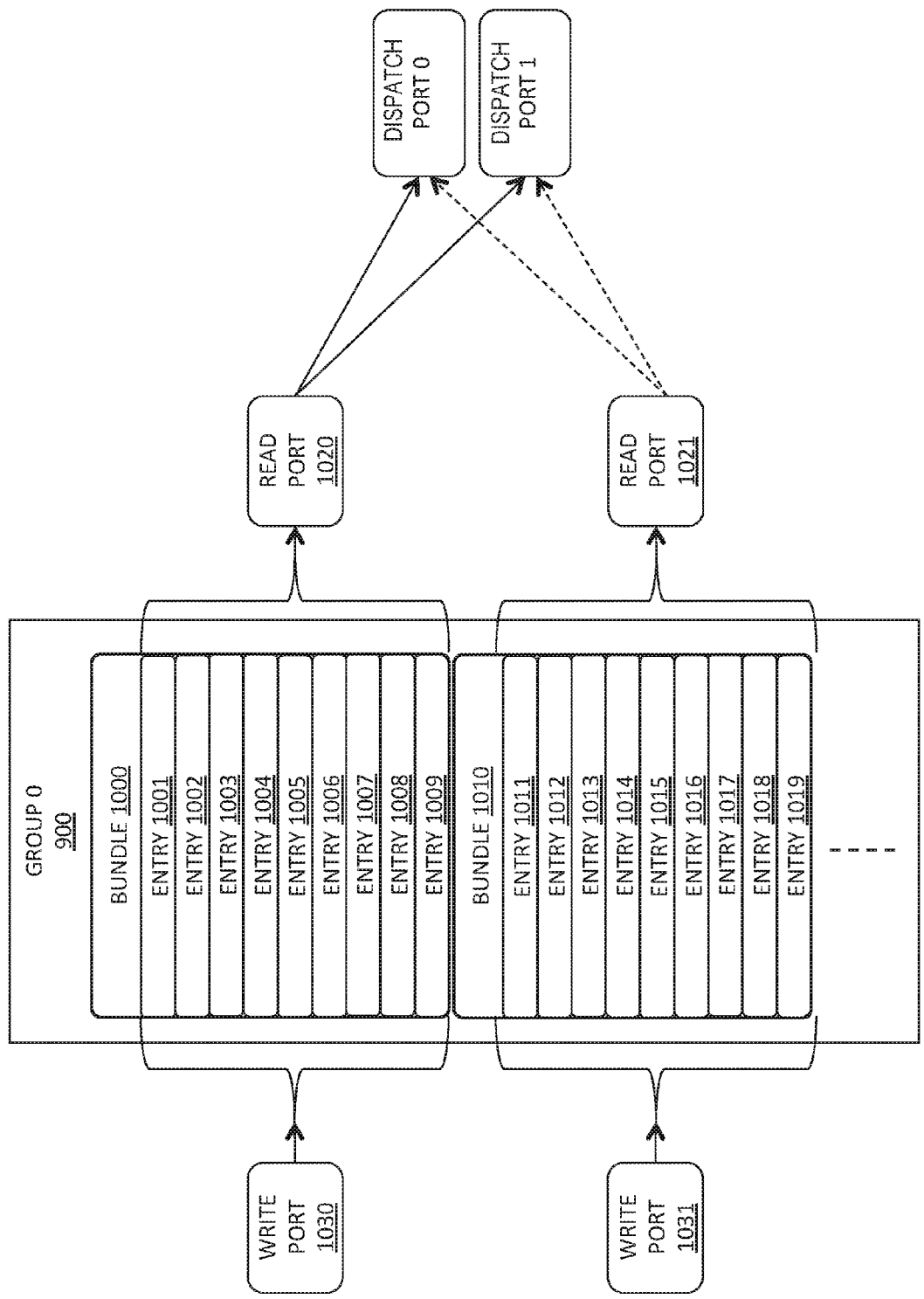
FIG. 10 illustrates one embodiment in which entries within a group are arranged into bundles.

In one embodiment, each reservation station group is comprised of a plurality of uop "bundles." One read port and one write port is provided for each bundle. For example, as illustrated in FIG. 10, group 0 900 includes bundle 1000 containing reservation station entries 1001-1009 and bundle 1010 containing reservation station entries 1011-1019. Write port 1030 allocates new uops to entries 1001-1009 of bundle 1000 and read port 1020 reads the uops from entries 1001-1009, sending the uops to either dispatch port 0 or dispatch port 1. Similarly, write port 1031 allocates new uops to entries 1011-1019 of bundle 1010 and read port 1020 reads the uops from entries 1011-1019, sending the uops to either dispatch port 0 or dispatch port 1.

In one embodiment, groups are classified as execution unit (EU) groups and memory (MEM) groups. For example, in FIG. 9, groups 0-5 may be EU groups and ports 0, 1, 4, 5, 6, and 8 may be ports coupled to functional units such as integer execution units and floating point execution units, etc. In this embodiment, groups 6-8 may be MEM groups and ports 2, 3, and 7 may support memory operations such as LOAD and STORE operations. In one embodiment, each bundle in an EU group has 3 restricted entries and 6 unrestricted entries while a bundle in a MEM group has 9 restricted entries. As used herein, a restricted entry is for a uop which is dependent on the completion of one or more other uops scheduled for execution. "Restricted" entries include multi-cycle uops or uops that don't wakeup using the EU matrix (LD, STA, STD, Branches etc.). These restricted entries must be built with less logic (e.g., fewer CBD rows) than unrestricted entries. Using the above parameters, the reservation station 820 may be built using 90 restricted+72 unrestricted entries=162 total entries. In one embodiment, fused uops will allocate one uop in the EU Groups and one uop in the MEM Groups.

While only group 0 900 is illustrated in FIG. 10 for simplicity, the same underlying principles apply to other groups, each of which includes two bundles with a write port and a read port associated with each bundle. For example, group 1 includes two bundles, each with one write port to receive newly allocated uops from allocator 812 and one read port to distribute uops to either dispatch port 0 or dispatch port 6.

In one embodiment, each uop is assigned a portbinding class based on the particular ports which may be used for execution of that uop. For example, a uop assigned portbinding class P0 may be scheduled for execution by port 0 whereas a uop assigned to portbinding class P01 may be scheduled for execution by either port 0 or port 1.

The table in FIG. 11 illustrates an exemplary set of portbinding classes and the associated groups to which uop in those classes may be allocated. As indicated, some portbinding classes may be assigned to only "static" portbinding groups, whereas other portbinding classes may be assigned to either "dynamic" or "static" portbinding groups. As used herein, a "dynamic" group is one which is connected to multiple ports which may be used for the execution of a particular uop whereas a "static" group is one which is connected to only a single port to be used for the execution of a particular uop. By way of example, groups G0 and G1 are static portbinding groups for portbinding class P0 because uops assigned to portbinding class P0 may only be executed by port 0 (to which both G0 and G1 are both coupled). In contrast, group G0 is a dynamic portbinding group for portbinding class P01 because uops assigned to portbinding class P01 may be executed by either port 0 or port 1—both of which are accessible by group G0. As a result, the scheduler 910 may dynamically determine whether to send portbinding class P01 uops to port 0 or port 1 at runtime. In one embodiment, the scheduler 910 may choose a particular port using the variables and algorithms discussed herein (e.g., based on the relative age of the uop, the current load, etc).

In one embodiment, the scheduler 910 schedules uops to ports as follows. Taking group 0 as an example, the scheduler 910 determines whether there is a ready P0 uop and/or a ready P1 uop the current cycle. In one embodiment, each uop entry includes a bit indicating whether the uop is ready for execution (e.g., if the source operands and necessary registers are available). Consequently, determining whether there is a ready P0 or P1 uop may be accomplished by performing an OR operation on this bit for all 9 entries in a bundle. In one embodiment, this is done for both bundles in a group (e.g., bundles 1000, 1010 in group 0).

Again, using group 0 as an example, within each bundle 1000, 1010, the scheduler 910 may determine the oldest P0 ready uop and the oldest P1 ready uop. In one embodiment, to determine the oldest P0 ready uop in a bundle, a 9×9 age matrix may be used (e.g., bundle 0, dispatch port 0, 9×9 matrix or "B0P0M9") in which all P0-only ready uops and P01 ready uops participate in the veto process. For example, the age matrix may include a row for each uop and a column for each uop. For each uop in a column that is older than the uop in each row, then the bit at that row and column is set to 1 (to indicate that a uop older than this row's uop exists in that column of the matrix). Thus, the uop in the column acts to "veto" the uop in the row. Determining the oldest ready uop is simply identifying the row which does not have any bits set in any of the columns with ready uops (i.e., no other ready uops are older than the uop in that row). This may be determined by ORing the bits from each row after disabling the columns of non-ready uops from participating in the ORing and choosing the row for which the result is 0. Similarly, to find the oldest ready P1 uop in a bundle, another 9×9 age matrix (B0P1M9) in which all P1-only ready uops and P01 ready uops will participate in the veto process. It should be noted, however, that the underlying principles of the invention are not limited to the above mechanism for determining the age of each uop.

In one embodiment, the oldest P0-uop in bundle 0 (B0) will be identified, along with the oldest P1-uop in B0, the oldest P0-uop in B1 and the oldest P1-uop in B1. The same uop could be the oldest P0-uop as well as P1-uop within a bundle (i.e., a P01 uop).

In one embodiment, the oldest uop in the group is selected first, and then the oldest uop from a different bundle is selected for execution on the remaining port supported by the group.

In one embodiment, an 18×18 age matrix is used in parallel (e.g., group 0 18×18 matrix or G0M18), where all ready uops in the group will participate in the veto process irrespective of portbinding classes. The result of this G0M18 matrix veto process is that the oldest ready uop in group 0 is identified. If the oldest ready uop in G0 is a P0-only uop in bundle B0, then this uop is chosen for port 0 from bundle B0. For the other bundle, B1, the winner of B1P1M9 is picked so that the remaining port (port 1) can be used for execution. By picking the oldest uop in a group each cycle and ping-ponging between the two bundles, the forward progress guarantee issue is satisfied (although a dispatched uop may still be cancelled due to non-availability of register file read ports etc).

The above functionality provides dynamic port-binding capability because the uops that are selected for dispatch within a group are bound to a particular dispatch port on which to execute dynamically, at schedule time. If in a particular cycle, two P01 uops in group G0 are the oldest uops in bundle B0 and bundle B1 respectively and if G0 wins schedule for dispatch port p0 and dispatch port p1 that cycle, one of the P01 uops would be bound to p0 and the other P01 uop would be bound to p1—this demonstrates the dynamic port-binding capability. This dynamic port-binding capability helps keep dispatch port busier compared to static port-binding and improves performance.

The table illustrated in FIG. 12 shows one possible scheme for picking two different winners from the two different bundles within a group—one winner per dispatch port for that group. The oldest ready uop in the group which is picked for execution is illustrated in the left-hand column. The other uop which is picked from the other bundle is indicated in the next column (labeled "Other winner from this Group"). For example, if the oldest ready uop is a P0 uop in bundle B0, then the other winner from the group is the B1P1M9 winner (i.e., the oldest P1 uop from bundle 1). Similarly, if the oldest ready uop is a P01 uop in bundle B1, then the other winner from the group is the B0P0M9 winner. Thus, the oldest uop from the group is selected first and then the oldest uop from the other bundle capable of being executed by the other port is selected.

As indicated in the table, if the oldest uop in the group is a P01 uop from bundle B0, then the following technique may be employed to identify the other uop. If bundle B1 has only a ready P0 uop (e.g., based on the OR9 result), then B0, P01 may be converted into a B0, P1 uop (i.e., for execution by port 1). If B1 only has a ready P1 uop, then B0, P01 may be converted into a B0, P0 uop (i.e., for execution by port 0). In one embodiment, if B1 has both a P0 ready uop and P1 ready uop or if B1 has no ready uop, then B0, P01 may be converted into a B0, P0 uop or B0, P1 uop in a ping-pong fashion based on the table illustrated in FIG. 13 (i.e., where the picking switches between even and odd numbered cycles). If the picker gives priority to P0 to group G0 this cycle, based on the ping-pong table, B0, P01 may be converted into B0, P0 as well.

Figure 14:
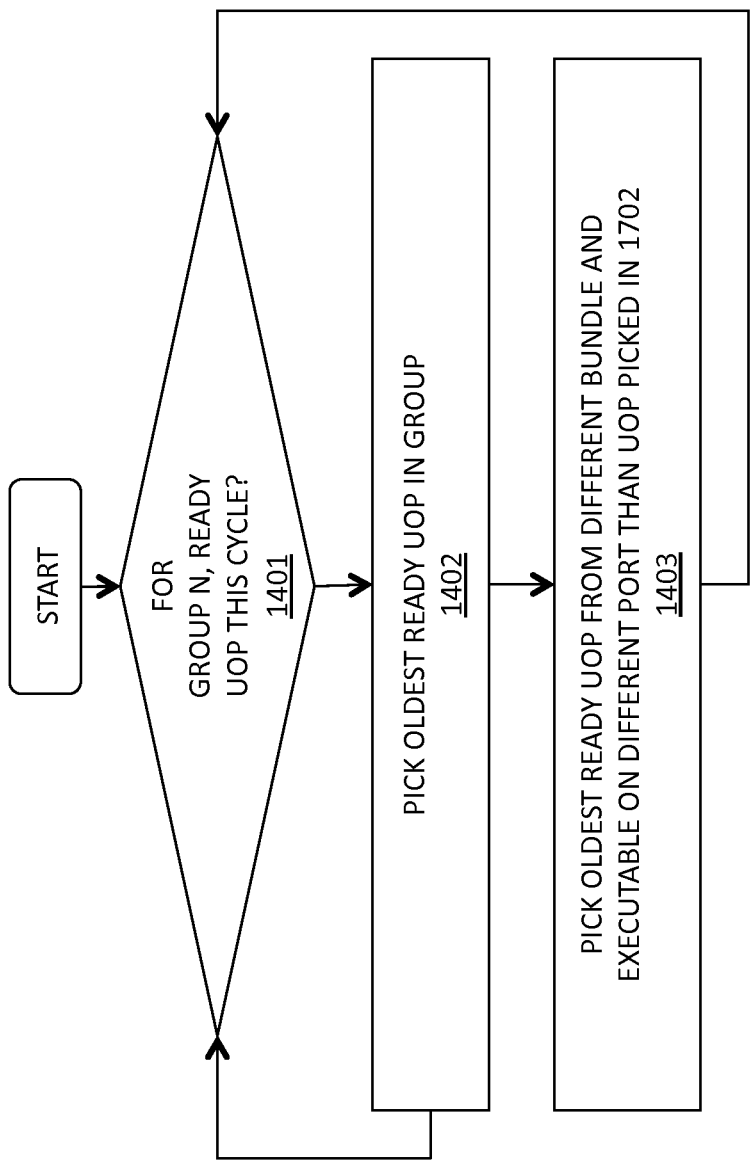
FIG. 14 shows a flowchart for scheduling two uops within a Group to two different ports each cycle.

A method in accordance with one embodiment of the invention is illustrated in FIG. 14. At 1401, a determination is made as to whether a ready uop is available for execution in the current cycle. If so, then at 1402, the oldest ready uop in the group is selected (e.g., using the techniques described above). At 1403, the oldest ready uop from a different bundle and executable on a different port is selected. In this manner, the read port associated with the first bundle and the read port associated with the second bundle may both be utilized in the same cycle.

In one embodiment, picker logic within the scheduler 910 operates as follows to pick the next uops for scheduling to dispatch ports. Each group sends information on what port uops are ready in that group to the picker logic. For example group G0 sends two signals to the picker—one signal indicating whether there is a ready P0 uop in G0 and another signal indicating whether there is a ready P1 uop in G0. As discussed above, determining whether there is a ready P0 or P1 uop may be accomplished by performing an OR operation on this bit for all 9 entries in a bundle. In one embodiment, this is done for both bundles in a group (e.g., bundles 1000, 1010 in group 0). This information is sent to the picker. Thus the picker is provided with information on what groups have ready uops on what ports.

The job of the picker is to decide which group wins the right to schedule to each dispatch port each cycle. For example, both G0 and G1 can schedule to port p0. If G0 and G1 just scheduled independently without any picker logic, they both could end up sending their own uop to port 0 in a particular cycle. In that cycle, port p0 would have 2 uops to execute, which is undesirable.

In contrast, the picker decides whether G0 or G1 wins the right to dispatch to p0 each cycle. Once the picker has picked dispatch port p0 to go to group G0 in the current cycle, then group G0 decides which uop within G0 to dispatch to port p0 that cycle (e.g., using the oldest uop within bundle etc., as described in detail above).

In one embodiment, the picker logic operates as follows. For each dispatch port, if only one of the two groups that can dispatch to that port, has a ready uop that can dispatch to that port, pick that group for that dispatch port. If both groups have a ready uop for a dispatch port, ping-pong between Groups (i.e. pick one group on even cycles and the other group on odd cycles). In this ping-pong scheme, let the same group not have ping-pong priority for the both of its dispatch ports in a cycle. The same ping-pong scheme shown in FIG. 13 may also apply here. The same ping-pong table is used for both the picker and within the group (for deciding whether to treat a P01 uop as a P0 or P1 uop) because the picker logic may pick P0 for group G0 and if the oldest uop in G0 is a P01 uop and the other bundle in G0 also has a P01 uop, it is better to assign this oldest uop to P0. Since the picker has picked G0 for P0, assigning P0 to the oldest uop in G0 guarantees this uop to be scheduled this cycle. If the oldest uop in G0 was assigned P1 instead, this uop may not schedule if P1 was assigned to a different group based on ping-pong.

In one embodiment, the picker logic is distributed (e.g., not in a centralized location for all dispatch ports). For example, the port 1 scheduling choice is between G0 and G2, which are two groups away, or a "distance" of two. The maximum distance between two groups that can schedule to the same dispatch port is two in this case. This helps the one cycle ready-schedule loop.

In one embodiment, the allocation logic within the allocator 812 operates as follows to allocate uops to groups. Based on portbinding class of uops in a line, the portbinding class table shown in FIG. 11 provides the list of groups to which each uop can be sent. Based on group occupancy, the allocation logic binds the uop to a group. In one embodiment, the allocation logic makes a tradeoff between balancing the groups and leaving the dynamic portbinding choice intact. For example, if a P01 uop comes up for allocation, the allocation logic could bind it to the G0 group and leave the dynamic portbinding possibility open. Alternatively, if G0 is too full, the allocation logic could bind it to group G1 and convert it to P0-only. The idea is that while the dynamic portbinding choice is removed here, if there are fewer uops in 01 compared to G0, this uop may have less competition to schedule. The allocation logic may also bind it to group G2 and convert it to P1-only.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the Figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A method comprising:
   classifying a plurality of operations based on dispatch ports usable to execute those operations;
   allocating the plurality of operations into groups within a reservation station based on the classification, wherein each group is serviced by one or more dispatch ports corresponding to the classification, and wherein two or more entries within a group share a common read port and a common write port; and
   dynamically scheduling two or more operations in a group for concurrent execution based on the dispatch ports capable of executing those operations and a relative age of the operations.

2. The method as in claim 1 wherein dynamically scheduling comprises:
   determining if a particular group has any operations ready for execution in a current cycle;
   picking an oldest ready operation as a first operation in the group; and
   picking another ready operation which is executable on a different port than the oldest ready operation as a second operation, thereby allowing the first and second operations to be executed concurrently through different dispatch ports.

3. The method as in claim 1 wherein each group is comprised of two bundles of operation entries, each of the bundles having one read port associated therewith.

4. The method as in claim 2 wherein scheduling comprises:
   determining if a particular group has any operations ready for execution in a current cycle;
   picking an oldest ready operation in the group, the oldest ready operation associated with a first bundle; and
   picking an oldest ready operation from a second bundle which is executable on a different dispatch port than the oldest ready operation from the first bundle, thereby allowing the first and second operations to be executed concurrently through different dispatch ports.

5. The method as in claim 1 wherein the operations comprise micro-operations generated from a macro-instruction.

6. The method as in claim 1 wherein the classification provided for a first operation specifies a dynamic portbinding group serviced by two or more dispatch ports over which the first operation may be executed.

7. The method as in claim 6 wherein the classification provided for the first operation comprises one or more static portbinding groups serviced by a single dispatch port over which the first operation may be executed.

8. The method as in claim 1 further comprising:
   implementing an aging matrix for the operations in the group to determine the relative age of the operations in the group.

9. A processor comprising:
   non-transitory machine-readable storage medium, storing instructions executable by the processor, wherein the processor is operative to:
   allocate a plurality of operations into groups within a reservation station based on a classification of the plurality of operations, the classification based on dispatch ports usable to execute those operations, wherein each group is serviced by one or more dispatch ports corresponding to the classification, and wherein two or more entries within a group share a common read port and a common write port; and
   dynamically schedule two or more operations in a group for concurrent execution based on the dispatch ports capable of executing those operations and a relative age of the operations.

10. The processor as in claim 9 wherein dynamically scheduling comprises:
    determining if a particular group has any operations ready for execution in a current cycle;
    picking an oldest ready operation as a first operation in the group; and
    picking another ready operation which is executable on a different dispatch port than the oldest ready operation as a second operation, thereby allowing the first and second operations to be executed concurrently through different dispatch ports.

11. The processor as in claim 9 wherein each group is comprised of two bundles of operation entries, each of the bundles having one read port associated therewith.

12. The processor as in claim 10 wherein scheduling comprises:

determining if a particular group has any operations ready for execution in a current cycle;

picking an oldest ready operation in the group, the oldest ready operation associated with a first bundle; and picking an oldest ready operation from a second bundle which is executable on a different dispatch port than the oldest ready operation from the first bundle, thereby allowing the first and second operations to be executed concurrently through different dispatch ports.

13. The processor as in claim 9 wherein the operations comprise micro-operations generated from a macro-instruction.

14. The processor as in claim 9 wherein the classification provided for a first operation specifies a dynamic portbinding group serviced by two or more dispatch ports over which the first operation may be executed.

15. The processor as in claim 14 wherein the classification provided for the first operation comprises one or more static portbinding groups serviced by a single dispatch port over which the first operation may be executed.

16. The processor as in claim 9 further comprising:

an aging matrix associated with the operations in the group to determine the relative age of the operations in the group.

17. A system comprising:

a memory for storing program code and data;

a input/output (IO) communication interface for communicating with one or more peripheral devices;

a network communication interface for communicatively coupling the system to a network; and a processor comprising:

allocation logic to allocate a plurality of operations into groups within a reservation station based on a classification of the plurality of operations, the classification based on dispatch ports usable to execute those operations, wherein each group is serviced by one or more dispatch ports corresponding to the classification, and wherein two or more entries within a group share a common read port and a common write port; and scheduling logic to dynamically schedule two or more operations in a group for concurrent execution based on the dispatch ports capable of executing those operations and a relative age of the operations.

18. The system as in claim 17 wherein dynamically scheduling comprises:

determining if a particular group has any operations ready for execution in a current cycle;

picking an oldest ready operation as a first operation in the group; and picking another ready operation which is executable on a different dispatch port than the oldest ready operation as a second operation, thereby allowing the first and second operations to be executed concurrently through different dispatch ports.

19. The system as in claim 17 wherein each group is comprised of two bundles of operation entries, each of the bundles having one read port associated therewith.

20. The system as in claim 18 wherein scheduling comprises:

determining if a particular group has any operations ready for execution in a current cycle;

picking an oldest ready operation in the group, the oldest ready operation associated with a first bundle; and picking an oldest ready operation from a second bundle which is executable on a different dispatch port than the oldest ready operation from the first bundle, thereby allowing the first and second operations to be executed concurrently through different dispatch ports.

21. The system as in claim 17 wherein the operations comprise micro-operations generated from a macro-instruction.

22. The system as in claim 17 wherein the classification provided for a first operation specifies a dynamic portbinding group serviced by two or more dispatch ports over which the first operation may be executed.

23. The system as in claim 22 wherein the classification provided for the first operation comprises one or more static portbinding groups serviced by a single dispatch port over which the first operation may be executed.

24. The system as in claim 17 wherein the processor further comprises:

an aging matrix associated with the operations in the group to determine the relative age of the operations in the group.

* * * * *